United States Patent [19]
Scott et al.

[11] Patent Number: 4,887,516
[45] Date of Patent: Dec. 19, 1989

[54] CLAMPING ARRANGEMENT FOR DIAPHRAGM PISTON ASSEMBLY

[75] Inventors: Daniel G. Scott, Swissvale; Theodore B. Hill, North Versailles, both of Pa.

[73] Assignee: American Standard Inc., Wilmerding, Pa.

[21] Appl. No.: 243,943

[22] Filed: Sep. 13, 1988

[51] Int. Cl.⁴ .......................... F01B 19/02; F16J 3/02
[52] U.S. Cl. ...................................... 92/98 D; 92/100
[58] Field of Search .............. 92/98 R, 98 D, 99, 100

[56] References Cited

U.S. PATENT DOCUMENTS

| 10,428 | 1/1854 | Hitchcock | 92/100 |
|---|---|---|---|
| 2,178,974 | 11/1939 | Smith et al. | 92/100 X |
| 3,335,641 | 8/1967 | Toschkoff | 92/98 R |
| 4,215,625 | 8/1980 | Hoffmann et al. | 92/100 X |
| 4,682,533 | 7/1987 | Hafner et al. | 92/98 R |

FOREIGN PATENT DOCUMENTS

| 2452748 | 5/1976 | Fed. Rep. of Germany | 92/99 |
|---|---|---|---|
| 289562 | 5/1928 | United Kingdom | 92/98 D |

Primary Examiner—Robert E. Garrett
Assistant Examiner—Mark A. Williamson
Attorney, Agent, or Firm—G. J. Falco

[57] ABSTRACT

A diaphragm clamping arrangement for assembly of a diaphragm-type piston in the body of a valve device or the like such that the diaphragm is biased in a direction to cause the diaphragm convolution to assume a preferred disposition in which a desired diaphragm "spring effect" is maintained.

9 Claims, 2 Drawing Sheets

4,887,516

CLAMPING ARRANGEMENT FOR DIAPHRAGM PISTON ASSEMBLY

BACKGROUND OF THE INVENTION

The present invention relates, in general, to diaphragm pistons that operate in the cavity of a body in the manner of a piston and cylinder and, in particular, to such diaphragm piston arrangements in which the diaphragm exhibits an inherent "spring effect", which can be beneficial particularly when the diaphragm piston is employed to operate pneumatic valving and the like.

In railroad brake control applications, where it is common practice to employ high pneumatic pressures on the order of 100 psi., for example, a fabric-reinforced-type of diaphragm is necessary to withstand the high-pressure forces without diaphragm "balooning" and subsequent failure. These fabric-reinforced diaphragms tend to be stiffer than regular diaphragms and thus exhibit a substantially noticeable "spring effect". This so-called "spring effect" is an inherent force within the diaphragm itself when the diaphragm is forced to assume a configuration other than its molded-in or normal configuration. This force typically acts in a direction to restore the diaphragm to its normal molded-in configuration. In sensitive operating control valves, as in the well-known, industry standard, ABD type railroad brake control valve device, in which the service valve is comprised of a diaphragm-type piston that positions a slide valve to achieve the desired brake control and functions in response to variations in the brake pipe/auxiliary reservoir pressure relationship acting across the diaphragm piston, it is desirable to actuate the piston at very low pressure differentials in order to position the slide valve and achieve the resultant control function without delay. This is particularly desirable in actuating the piston from its release position, as shown in FIG. 2 of the drawings, to its application position, as shown in FIG. and relies upon the diaphragm "spring effect" to help achieve this purpose.

Because of the relatively long service life required of diaphragms used in the above-mentioned application, conical-type diaphragms, as disclosed in U. S. Pat. No. 3,173,342 and incorporated herein by reference, are typically employed. The significantly long service life attributed to these conical-type diaphragms is achieved by maintaining the fabric material uniformly embedded in the rubber that comprise the diaphragm proper. This is possible since the normally flat fabric material is not required to assume an unnatural or convoluted shape during the molding process, as in bellows-type diaphragms, for example, and therefore does not tend to shift toward the surface of the rubber. In realizing a long service life, however, due to the fabric material in conical-type diaphragms being unstressed during the vulcanizing process, these conical-type diaphragms also exhibit a relatively light "spring effect" for the same reasons.

Consequently, the efficiency of the control valve device employing such conical-type diaphragms is compromised with respect to achieving fast brake response. Moreover, the convolution in these conical-type diaphragms has been found to take an inside-out set over a period of time, which further reduces the diaphragm "spring effect" and contributes to the decline in brake response.

It will be understood, for example, that during a brake release, a relatively high pressure differential is created across piston 2, thereby causing convolution 17 of diaphragm 1 to become inverted during movement of piston 2 from application position to release position, as shown in FIG. 2. It is important to note at this point that the bend formed at clamping bead 10 between the outer diaphragm periphery and convolution 17 is essentially 90°. Diaphragm 1 is provided with internal stress due to this bend, in addition to the stress due to the diaphragm convolution. Once movement of piston 2 to brake release position is complete and the pressures across piston 2 have become substantially equalized, the inherent "spring effect" of diaphragm due to the internal diaphragm stresses is intended to gradually force the diaphragm convolution 14 to automatically unfold or revert back to its normal upward disposition, as shown by the dotted lines of FIG. 2. Piston 2 is, therefore, in readiness for immediate actuation to application position in terms of the "spring effect" being in the desired direction to encourage movement of piston 2 toward application position. Also, the volumetric displacement between the pressure chambers on opposite sides of the diaphragm piston, due to transition of the diaphragm convolution, will have occurred prior to a subsequent reduction of brake pipe pressure when a brake application is desired.

In the event, however, the diaphragm convolution 17 does not revert back to its normal position following release of a brake application; and, since the piston normally remains in release position for a considerably long period of time between brake applications, the diaphragm convolution 17 tends to take a set in a downward disposition, as shown by the solid lines in FIG. 2. The result of this is that the initial upward-acting "spring effect" is lost, and the set resists further diaphragm movement. Consequently, a higher than normal pressure differential is required to actuate piston 2 when a brake application is subsequently initiated, thus increasing response time and adversely extending the time required to obtain braking. This condition is aggravated by the fact that the conventional clamping arrangement of the ABD type control valve service piston diaphragm, as shown in FIGS. 1 and 2, predisposes the diaphragm convolution in a downwardly-directed disposition by reason of the clamping face of cover 3 urging the outer periphery of diaphragm 1 into engagement with the tapered surface of clamping bead 10.

The object of the present invention, therefore, is to provide a diaphragm clamping arrangement for a diaphragm piston that increases the internal diaphragm stress when the diaphragm convolution becomes inverted to better encourage the diaphragm convolution to revert to a predetermined disposition corresponding to the direction of the diaphragm "spring effect".

Briefly, this objective is achieved by providing a conical surface on one of the upper and lower members between which the outer diaphragm periphery is clamped. This conical surface lies adjacent a clamping bead formed on the other body member, so that when the upper and lower body members are tightened down, the diaphragm is forced to follow an angle corresponding to the slope of the conical surface against which it is clamped by the clamping bead. By sloping the conical surface in a direction to urge the diaphragm convolution in an upward direction, i.e., in a brake application direction, a sharper than normal bend is formed about the diaphragm clamping bead when the diaphragm convolution becomes inverted. This produces a greater internal stress on the diaphragm tending to cause the diaphragm convolution to revert to its normal disposition, even when conical-type diaphragms that typically exhibit a low "spring effect" are employed.

BRIEF EXPLANATION OF THE DRAWINGS

The foregoing object and attendant advantages of the invention will be more readily apparent from the following more detailed explanation of the invention, when taken in conjunction with the drawings in which.

DESCRIPTION AND OPERATION

Figure 1:
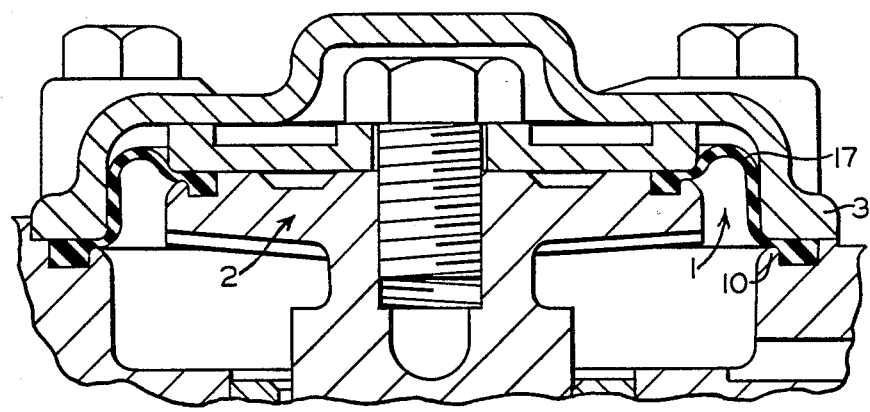
FIGS. 1 and 2 are partial assembly views of a conventional diaphragm piston assembly, as employed in an ABD type freight brake control valve service portion, showing the disposition of the diaphragm convolution in application and release positions of the piston, respectively.
Figure 2:
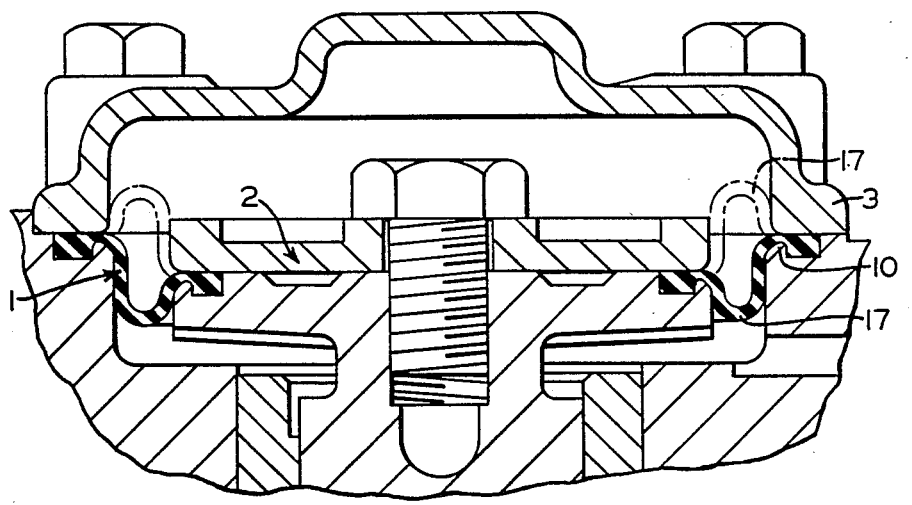
Figure 3:
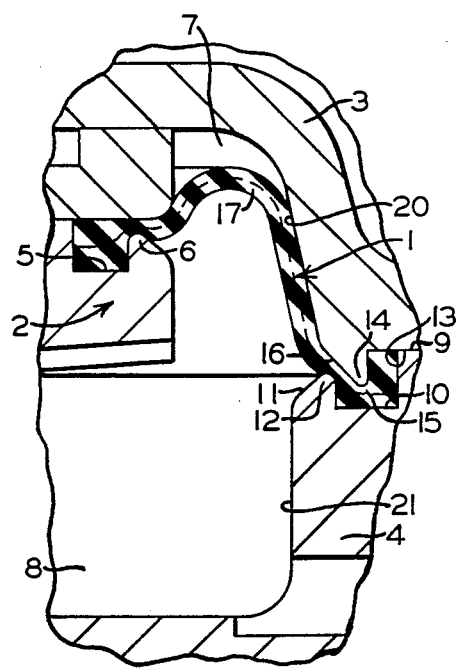
FIGS. 3 and 4 ar partial assembly views of a diaphragm piston assembly in accordance with the present invention, showing disposition of the diaphragm convolution in application and release positions of the piston, respectively.
Figure 4:
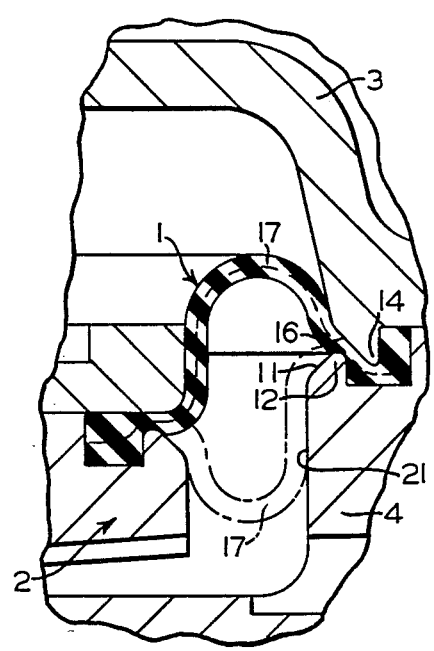

Referring now to FIGS. 3 and 4, a diaphragm 1, as for example a conventional conical-type diaphragm, is clamped at its inner periphery to piston 2 and at its outer periphery between a cover member 3 and body 4. An annular groove 5 and clamping bead 6 of piston 2 provide a conventional clamping arrangement at the inner diaphragm periphery corresponding to the clamping arrangement shown in FIGS. 1 and 2. The outer periphery of diaphragm 1 is clamped between cover member 3 and body 4 in a unique manner, as will hereinafter be explained. It will be understood, of course, that this unique clamping arrangement is also applicable with respect to clamping of the inner diaphragm's periphery.

A fluid pressure chamber 7 is formed on the upper side of diaphragm 1 between piston 2 and cover member 3, and a fluid pressure chamber 8 is formed on the under side of diaphragm 1 between piston 2 and body 4. A clamping face 9 of body 4 is formed with an annular recess 10, the inside wall of which forms, in conjunction with a bevel surface 11 of chamber 8, an annular clamping bead 12, in a conventional manner.

A clamping face 13 of cover member 3 is provided with an annular clamping bead 14 that projects from the clamping face 13. The crown of bead 14 lies opposite annular recess 10 and extends into the area defining the recess 10 sufficiently to secure an enlarged end 15 formed at the outer periphery of diaphragm to thereby clamp the diaphragm at its outer periphery between cover member 3 and body 4. Extending from bead 14 to the side wall 20 of chamber 7 is an annular bevel surface 16 having an angle of inclination relative to the clamping face 13 of cover member 3. Bevel surface 16 lies opposite clamping bead 12 on body 4 and is in such proximity therewith as to resist pull-out of the enlarged end 15 of diaphragm 1 from recess 10. In this regard, the distance between bevel surface 16 and bead 12, taken along a line perpendicular to surface 16, is not only less than the enlarged end 15 of diaphragm 1 but is also less than the diaphragm thickness, so that the diaphragm outer periphery is pressed against surface 16 under tension when cover 3 is tightened onto body 4, thereby directing the diaphragm in a preferred upward direction that tends to cause the normal diaphragm convolution 17 to likewise assume an upwardly-directed disposition. It will be appreciated that this upward dispostion of the diaphragm convolution, due to the clamping arrangement, corresponds to the natural tendency of the diaphragm to assume its molded-in configuration.

For example, in the assembly of a conical-type diaphragm, as shown and explained in the referencing patent, the diaphragm is initially located on piston 2 in an inverted, frusto-conical position, i.e., with the larger diameter of the diaphragm above the smaller diameter, so that the circumferential surface of the diaphragm has an upwardly-expanding area. After clamping the smaller diameter in piston 2, the outer periphery is then folded down over the inner periphery and clamped in place between cover 3 and body 4. The surface area of diaphragm 1 is such that a loop or convolution 17 forms in a well-known manner, the convolution assuming an upward disposition because of the natural tendency of the diaphragm to unfold and assume its molded-in configuration. Accordingly, diaphragm 1 produces the aforementioned "spring effect" that acts on piston 2 in the direction of the convolution, i.e., in a preferred upward direction.

It will be understood that where a downward-acting "spring effect" is desired, the diaphragm 1 may be assembled by reversing the foregoing procedure, including positioning the diaphragm in a right-side-up position. It will also be understood that the above-discussed mounting arrangement is also applicable to bellows-type diaphragms, which are characterized by a molded-in convolution, as well as the conical-type diaphragms.

It will be appreciated now that when service piston 2 is forced toward release position, as shown in FIG. 4, due to the differential force on piston 2 acting in a downward direction, by reason of brake pipe pressure in chamber 7 being greater than auxiliary reservoir pressure in chamber 8, diaphragm convolution 17 may turn inside-out so as to be in a downward-facing position, shown by dotted lines in FIG. 4. Generally, this condition has been found to occur during brake releases following a service brake application, due to the high pressure differential that results from the well-known accelerated release function of the ABD type control valves.

In that clamping bead 12 exerts a clamping force on diaphragm 1 to urge the diaphragm against conical surface 16, the diaphragm has a direction of inclination adjacent the outer periphery thereof that urges the convolution 17 to assume a direction corresponding to the preferred direction. The effect of this is to cause the diaphragm to bend around clamping bead 12 at a more acute angle (e.g. 45°) than heretofore achieved, when the diaphragm convolution becomes inverted, thereby creating a high internal diaphragm stress to encourage the diaphragm convolution to revert to its normal disposition. Therefore, as the downward-acting force of the effective pressure differential on piston 2 decreases following movement of piston 2 to release position, the internal diaphragm force due to the upwardly-directed angle of inclination of diaphragm 1 at its outer periphery, combined with the existing internal stress resulting from the upward-acting force of the diaphragm convolution, encourages the diaphragm convolution 17 to flip back to its normal upward disposition indicated by the solid lines in FIG. 4. In so doing, diaphragm 1 is conditioned, following release of a brake application and with piston 2 in its lower-most release position, to exert an upward-acting "spring effect" on piston 2.

This not only has the effect of establishing the desired "spring effect" of diaphragm but further prevents the diaphragm convolution from taking a set in an inappropriate disposition, while further assuring that the volumetric exchange between chambers 7 and 8, due to displacement or reversal of the diaphragm convolution, will have occurred during brake release phase of operation and therefore prior to initiation of a brake application. Accordingly, piston 2 is preconditioned to move toward application position, without hesitation, in response to a relatively low pressure differential thereacross, when brake pipe pressure effective in chamber 7 is reduced relative to auxiliary reservoir pressure effective in chamber 8, thereby assuring a faster application of the brakes throughout the train during a subsequent brake application phase of operation.

In addition, the side wall 20 of chamber 7 is formed with a larger diameter than the corresponding side wall 21 of chamber 8. This can be achieved either with a vertical side wall or, preferably, with a tapered side wall, as shown in FIGS. 3 and 4. The benefit of such a design is to maximize the distance between the diaphragm clamping points on piston 2 and body 4, and to increase the effective diaphragm area subject to fluid pressure in chambers 7 and 8. In maximizing the distance between clamping points, the force required to toggle convolution 17 over center is reduced, thereby providing more positive assurance of the diaphragm convolution automatically reverting to its preferred state as the pressure differential across piston 2 dissipates following movement of piston 2 to release position. By increasing the effective diaphragm area, the force required to actuate piston 2 is achieved with a reduced differential pressure between chambers 7 and 8.

It will be appreciated, therefore, that these features go hand-in-hand with the advantages achieved through the diaphragm clamping arrangement of the invention in providing faster and more positive actuation of piston 2 and, consequently, faster application of the brakes.

Moreover, such an arrangement lends itself to simple modification of a conventional, standard ABD control valve device.

We claim:

1. A diaphragm clamping arrangement for mounting a diaphragm piston in a valve body comprising:
   (a) a fluid pressure operated piston member disposed in said valve body with an annular space therebetween for axial movement in opposite directions to an application position and a release position;
   (b) an annular diaphragm member fixed at its inner periphery to said piston member;
   (c) said body including first and second sections between which the outer periphery of said diaphragm is clamped;
   (d) first and second pressure chambers formed between said diaphragm piston and said first body section and between said diaphragm piston and said second body section respectively;
   (e) a convolution of said diaphragm formed in said annular space, said convolution having a preferred direction of formation in which said convolution is disposed when said piston member is moved toward said application position in response to a first pressure differential between said first and second pressure chambers, said convolution being inverted from said preferred direction of formation when said piston member is moved toward said release position in response to a second pressure differential between said first and second chambers;
   (f) said first section including:
     (i) a first clamping face;
     (ii) an annular clamping groove recessed in said first clamping face in which said outer periphery of said diaphragm member is contained; and
     (iii) a first annular clamping bead projecting from said clamping groove; and
   (g) said second section including:
     (i) a second clamping face adjoining said first clamping face; and
     (ii) an annular bevel surface of said second clamping face spaced opposite said first annular clamping bead such that said diaphragm adjacent said outer periphery is forced by said first clamping bead into engagement with said bevel surface, said bevel surface being inclined in a direction corresponding to said preferred direction of formation of said convolution.

2. A diaphragm clamping arrangement, as recited in claim 1, wherein said first clamping bead projects from said clamping groove a distance less than the distance said groove is recessed from said first clamping face.

3. A diaphragm clamping arrangement, as recited in claim 2, wherein said second section further comprises a second annular clamping bead in which said bevel surface terminates, said second clamping bead projecting from said second clamping face adjacent said clamping groove to engage said outer periphery of said diaphragm member.

4. A diaphragm clamping arrangement, as recited in claim 3, wherein the distance between said bevel surface and said first clamping bead taken along a line perpendicular to said bevel surface is less than the thickness of said diaphragm.

5. A diaphragm clamping arrangement, as recited in claim 4, wherein said first section of said body is a main body portion, and said second section of said body is a cover portion that is removably attached to said main body portion.

6. A diaphragm clamping arrangement, as recited in claim 1, wherein the angle of inclination of said bevel surface causes said diaphragm to form a bend around said first clamping bead between said outer periphery and said annular convolution when said diaphragm convolution is inverted from said preferred direction of formation, said bend having an angle less than 90°.

7. A diaphragm clamping arrangement, as recited in claim 1, wherein said diaphragm member includes a reinforcing fabric imbedded therein.

8. A diaphragm clamping arrangement, as recited in claim 1, wherein said first section of said body is a main body portion and said second section of said body is a cover portion that is removably attached to said main body portion, said main body portion having a first side wall delineating the diameter of said first pressure chamber and said cover portion having a second side wall delineating the diameter of said second pressure chamber, the diameter of said second side wall being greater than the diameter of said first side wall.

9. A diaphragm clamping arrangement, as recited in claim 8, wherein said second side wall intersects said bevel surface, said second side wall being tapered such that the point of intersection thereof with said bevel surface is at the greatest diameter of said second side wall.

* * * * *